United States Patent Office 3,432,506
Patented Mar. 11, 1969

3,432,506
MANUFACTURE OF 2,4-(1H,3H)-PYRIDINEDIONES
Kent C. Brannock, Kingsport, Tenn., assignor to Eastman Kodak Company, Rochester, N.Y., a corporation of New Jersey
No Drawing. Filed Jan. 24, 1966, Ser. No. 522,352
U.S. Cl. 260—289
Int. Cl. C07d 33/46, 31/32
7 Claims

ABSTRACT OF THE DISCLOSURE

Preparation of 2,4-(1H,3H)-pyridinediones by reacting certain imines with certain substituted malonyl chlorides.

This invention relates to a novel method for preparing certain 2,4-(1H,3H)-pyridinediones. More specifically, it relates to a method for preparing 2,4-(1H,3H)-pyridinediones by combining substituted malonyl chlorides with imines.

2,4-(1H,3H)-pyridinediones are known compounds and several varied methods for their preparation have been described in the literature. British Patent No. 742,733 pertains to alkyl tetrahydropyridinediones and alkyl piperidinediones. The patent shows the preparation 2,4-dioxo-3,3-diethyl - 5-(hydroxymethyl)-tetrahydropyridine and 5-methyl derivative. U.S. Patent No. 2,137,192 pertains to a process for the preparation of 2,4-dioxo-3,3-dialkyl-6-methyl-tetrahydropyridine by treating the corresponding 2,4 - dioxo-3,3-dialkyl-6-methylpyrandihydride with $NH_3$.

An object of this invention is to provide a method for preparing 2,4-(1H,3H)-pyridinediones.

Another object is to provide a method for preparing 2,4-(1H,3H)-pyridinediones by combining substituted malonyl chlorides with certain imines.

These and other objects are attained by the practice of this invention which, briefly, comprises mixing an imine with a substituted malonyl chloride preferably in the presence of a hydrogen chloride acceptor and isolating the product.

More specifically, the certain 2,4-(1H,3H)-pyridinediones are obtained by reacting an imine having the formula

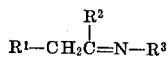

with a substituted malonyl chloride having the formula

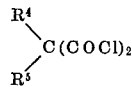

and providing a 2,4-(1H,3H)-pyridinedione having the formula

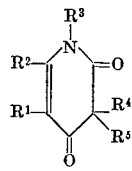

wherein each $R^1$ and $R^2$, when taken singly, is selected from the group consisting of hydrogen, alkyl, preferably having from 1 to 10 carbon atoms, and mononuclear aryl, preferably having from 6 to 10 carbon atoms; the substituent $R^3$ is selected from the group consisting of alkyl having from 1 to 12 carbon atoms and mononuclear aryl having from 6 to 10 carbon atoms; each of the substituents $R^4$ and $R^5$, when taken singly, is selected from the group consisting of alkyl having from 1 to 8 carbon atoms and mononuclear aryl having from 6 to 10 carbon atoms; the substituents $R^1$ and $R^2$, when taken collectively with the carbon atoms to which they are attached, represent joined alkylene groups completing a carbocyclic ring, preferably having from 4 to 10 carbon atoms; and the substituents $R^4$ and $R^5$, when taken collectively with the carbon atom to which they are attached, represent joined alkylene groups completing a carbocyclic ring, preferably having 4 to 10 carbon atoms.

The substituted malonyl chlorides that are suitable for the present process include the following: diphenylmalonyl chloride, dimethylmalonyl chloride, diethylmalonyl chloride, ethylmethylmalonyl chloride, dibutylmalonyl chloride, butylethylmalonyl chloride, butyloctylmalonyl chloride, methylpropylmalonyl chloride, dioctylmalonyl chloride, dibenzylmalonyl chloride, cyclohexane-1,1-dicarbonyl chloride, etc. These compounds may be prepared according to known techniques by reacting the corresponding dialkylmalonic acid with thionyl chloride or a similar chlorinating agent.

The imines, aldimines and ketimines, used in this invention are well-known compounds which are readily prepared from a carbonyl compound and a primary amine. A review of preparations for imines has been presented by R. W. Layer in Chem. Rev. 63, 489 (1963). The imines that are suitable for the present process include the following: N-butylidene-isopropylamine, N-cyclohexylidene - propylamine, N - cyclopentylidene - propylamine, N-cyclohexylideneaniline, N-heptylideneaniline, N-isopropylideneaniline, N - (1 - phenylethylidene)-butylamine, N-cyclooctylidenepropylamine, N-(1-methylpropylidene) - cyclohexylamine, N - cyclopentylidene - 4 - methoxyaniline, N - (4 - methylhexylidene)-3-methylaniline, etc.

In the practice of the present process, it is preferred, for best operation, to use a hydrogen chloride acceptor material in the reaction medium to keep the reaction from becoming too acidic. However, the reaction may be operated either using an excess of hydrogen chloride acceptor material in the reaction or it may be run in the absence of a hydrogen chloride acceptor. Hydrogen chloride acceptor materials which may be used include compounds such as triethylamine, trimethylamine, triethylene diamine, 1,4-dimethylpiperazine, tributylamine, pyridine, quinoline and N,N'-dimethylethylenediamine.

It is preferred to conduct the reaction in an anhydrous system. However, an aqueous system using such bases as sodium hydroxide or potassium hydroxide is operable.

In the process for preparing certain 2,4-(1H,3H)-pyridinediones by reacting imines with substituted malonyl chlorides, it is preferred, but not necessary, to use a solvent. Suitable solvents are restricted to materials that do not react with the reagents. Typical classes of solvents include ethers, esters, aliphatic and aromatic hydrocarbons and chlorinated hydrocarbons, nitriles, and certain dipolar aprotic solvents such as dimethylformamide, dimethylacetamide, dimethylsulfoxide, tetramethylene sulfone, propylene carbonate, etc.

The substituted malonyl chloride and imine may be added to the suitable solvent and hydrogen chloride acceptor to form a product. However, in the practice of the invention, it is preferred to add the malonyl chloride rapidly to a solution of one of the above noted imines, hydrogen chloride acceptor material and a suitable solvent. The molar ratio of the substituted malonyl chloride, to the imine and the hydrogen chloride acceptor material is generally about 1:1:2 to about 1:1:3. However, the molar ratio may be varied.

The temperature of the subject reaction is generally governed by the nature of the reactants. Suitable reaction temperatures are within the range of from 0° to 200° C.

3,432,506

The products may be isolated from the reaction mixture by conventional techniques.

The compounds of the present invention possess sedative and hypnotic properties which make them useful in medicines, such as in veterinary preparations.

Example 1

To a stirred solution of butylidene isopropylamine (62 g.; 0.55 mole) and triethylamine (158 g.; 1.65 moles) in toluene (100 ml.) was added rapidly dimethylmalonyl chloride (93 g.; 0.55 mole). The resulting mixture was refluxed for 6 hrs. After cooling, triethylamine hydrochloride was removed by filtration. The filtrate was distilled through a 6-in. Vigreux column to give 105 g. (91%) of 5-ethyl-3,3-dimethyl-1-isopropyl-2,4-(1H,3H)-pyridinedione, B.P. 106–107° C. (1 mm.). This material solidified on cooling. A sample that was recrystallized from carbon tetrachloride melted at 59–61° C.

*Analysis.*—Calcd. for $C_{12}H_{19}NO_2$: C, 68.9; H, 9.2; N, 6.7. Found: C, 68.6; H, 8.9; N, 6.8.

The following equation illustrates the reaction that took place.

$C_3H_7CH=NCH(CH_3)_2 + (CH_3)_2C(COCl)_2 \longrightarrow$

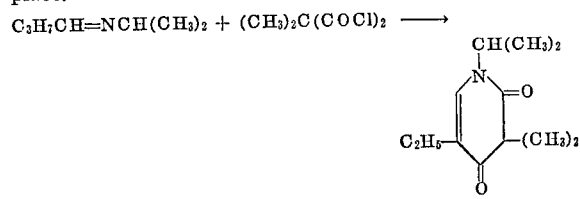

Example 2

Dimethylmalonyl chloride (50.7 g., 0.3 mole) was added slowly to a stirred solution of N-cyclohexylidene propylamine (42 g.; 0.3 mole) and triethylamine (91 g.; 0.9 mole) in toluene (400 ml.). The temperature rose to 100° C. and the mixture was later refluxed for 4 hrs. Triethylamine hydrochloride (82 g., 100%) was removed by filtration and the filtrate was distilled through a 6-in. Vigreux column to give 57 g. (81%) of 5,6,7,8-tetrahydro-3,3-dimethyl-1-propyl-2,4-(1H,3H)-quinolinedione, B.P. 124–126° C. (0.3 mm.)

*Analysis.*—Calcd. for $C_{14}H_{21}NO_2$: C, 71.5; H, 9.0; N, 6.0. Found: C, 72.3; H, 9.2; N, 6.1.

The reaction that occurred is represented by the following equation:

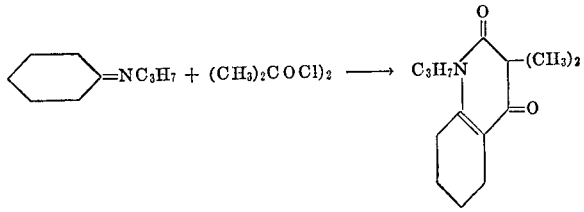

Example 3

To a stirred solution of cyclopentylidene propylamine (31.25 g.; 0.25 mole) and triethylamine (51 g.; 0.5 mole) in toluene (500 ml.) was added dimethylmalonyl chloride (42.25 g.; 0.25 mole). The reaction was exothermic and the temperature rose to 100° C. After cooling, 500 ml. of water was added and the organic phase was separated and dried over anhydrous magnesium sulfate. Distillation through a 10-in. packed column afforded 42 g. (76%) of 6,7-dihydro-3,3-dimethyl-1-propyl-5H-1-pyridine-2,4-(1H,3H)-dione, B.P. 135–138° C. (1 mm.), $n_D^{20}$ 1.5285.

*Analysis.*—Calcd. for $C_{13}H_{19}NO_2$: C, 70.5; H, 8.7; N, 6.3. Found: C, 70.3; H, 8.5; N, 6.2.

The following equation represents the reaction that took place:

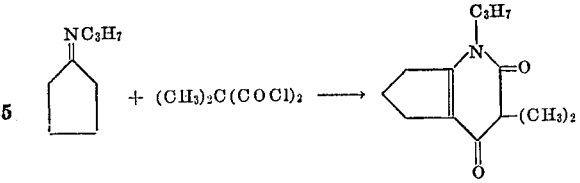

Example 4

When reacted under the general conditions of Example 1, the imines and substituted malonyl chlorides listed in the following table give the indicated products.

| Imine | Malonyl Chloride | Product |
| --- | --- | --- |
| ⬡=NC₆H₅ | $(C_2H_5)_2C(COCl)_2$ | (bicyclic product with $C_6H_5$ on N, $(C_2H_5)_2$) |
| $C_6H_{11}$—CH=NC₆H₅ | $(C_8H_{17})_2C(COCl)_2$ | (pyridinedione with $C_6H_5$ on N, $C_6H_{11}$, $(C_8H_{17})_2$) |
| $(CH_3)_2C=NC_6H_5$ | $(C_6H_5)_2C(COCl)_2$ | (pyridinedione with $C_6H_5$ on N, $CH_3$, $(C_6H_5)_2$) |
| $C_6H_5$\C=NC₄H₉ / $CH_3$ | ⬡(COCl)(COCl) | (pyridinedione with $C_4H_9$ on N, $C_6H_5$, spirocyclohexyl) |

| Imine | Malonyl Chloride | Product |
|---|---|---|
| [structure: cyclooctylidene=NC₃H₇] | $\begin{array}{c}C_2H_5\\ \diagdown\\ C(COCl)_2\\ \diagup\\ CH_3\end{array}$ | [structure with C₃H₇, C₂H₅, CH₃] |
| $\begin{array}{c}C_2H_5\\ \diagdown\\ C=NC_6H_{13}\\ \diagup\\ CH_3\end{array}$ | $(CH_3)_2C(COCl)_2$ | [structure with C₆H₁₃, C₂H₅, (CH₃)₂] |
| [structure: cyclopentylidene=N—C₆H₄—OCH₃] | $(CH_3)_2C(COCl)_2$ | [structure with OCH₃ and (CH₃)₂] |
| [structure: CH₃-cyclohexylidene=N—C₆H₄—CH₃] | $(CH_3)_2C(COCl)_2$ | [structure with CH₃, CH₃, (CH] |

Although the invention has been described in considerable detail with particular reference to certain preferred embodiments thereof, variations and modifications can be effected within the spirit and scope of the invention as described hereinbefore, and as defined in the appended claims.

I claim:
1. The process in which an imine having the formula

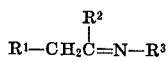

is reacted with a malonyl chloride having the formula

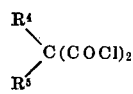

at a temperature of about 0° C. to about 200° C. to form a 2,4-(1H,3H)-pyridine dione having the formula

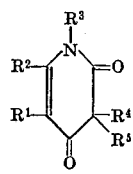

wherein each $R^1$ and $R^2$, when taken singly, is selected from the group consisting of hydrogen and alkyl having 1 to 10 carbon atoms; the substituent $R^3$ is alkyl having from 1 to 12 carbon atoms; each of the substituents $R^4$ and $R^5$, when taken singly, is alkyl having from 1 to 8 carbon atoms; the substitutents $R^1$ and $R^2$, when taken collectively with the carbon atoms to which they are attached, are joined alkylene groups completing a carbocyclic ring; and the substituents $R^4$ and $R^5$, when taken collectively with the carbon atom to which they are attached, are joined alkylene groups completing a carbocyclic ring having from 4 to 10 carbon atoms.

2. The process of claim 1 in which the imine and the malonyl chloride are contacted in the presence of a hydrogen chloride acceptor material.

3. The process of claim 3 in which the molar ratio of the malonyl chloride to the imine and hydrogen chloride acceptor material is from about 1:1:2 to about 1:1:3.

4. The process of claim 3 in which the malonyl chloride is added rapidly to a solution of the imine and hydrogen chloride acceptor in the inert solvent.

5. The process of claim 1 in which the imine is n-butylidene isopropylamine, the malonyl chloride is dimethylmalonyl chloride and the 2,4-(1H,3H)-pyridine dione obtained is 5-ethyl-3,3-dimethyl-1-isopropyl-2,4-(1H,3H)-pyridine dione.

6. The process of claim 1 in which the imine is n-cyclohexylidene propylamine, the malonyl chloride is dimethylmalonyl chloride and the 2,4-(1H,3H)-pyridine dione obtained is 5,6,7,8-tetrahydro-3,3-dimethyl-1-propyl-2,4-(1H,3H)-quinolinedione.

7. The process of claim 1 in which the imine is n-cyclopentylidene propylamine, the malonyl chloride is dimethylmalonyl chloride and the 2,4-(1H,3H)-pyridine dione obtained is 6,7-dihydro-3,3-dimethyl-1-propyl-5H-1-pyridine-2,4-(1H,3H)-dione.

References Cited

UNITED STATES PATENTS

| | | | |
|---|---|---|---|
| 2,090,068 | 8/1937 | Preiswerk | 260—297 |
| 2,137,192 | 11/1938 | Schnider | 260—297 |
| 3,133,928 | 5/1964 | Wiggins et al. | 260—289 |

ALEX MAZEL, *Primary Examiner.*

D. G. GAUS, *Assistant Examiner.*

U.S. Cl. X.R.

260—297, 544, 583, 563, 577, 268, 290, 283, 999

UNITED STATES PATENT OFFICE
CERTIFICATE OF CORRECTION

Patent No. 3,432,506                March 11, 1969

Kent C. Brannock

It is certified that error appears in the above identified patent and that said Letters Patent are hereby corrected as shown below:

Column 4, lines 5 to 13, the portion of the formula readi: "+$(CH_3)_2COCl)_2$" should read -- +$(CH_3)_2C(COCl)_2$ --. Column 6, lines 62 and 65, claim reference numerals "3", each occurrence should read -- 2 --.

Signed and sealed this 7th day of April 1970.

(SEAL)
Attest:

Edward M. Fletcher, Jr.                WILLIAM E. SCHUYLER, JR.
Attesting Officer                      Commissioner of Patents